(No Model.)
M. CRESALIA.
WATER REGULATOR ATTACHMENT.
No. 388,954. Patented Sept. 4, 1888.
Fig. 1.
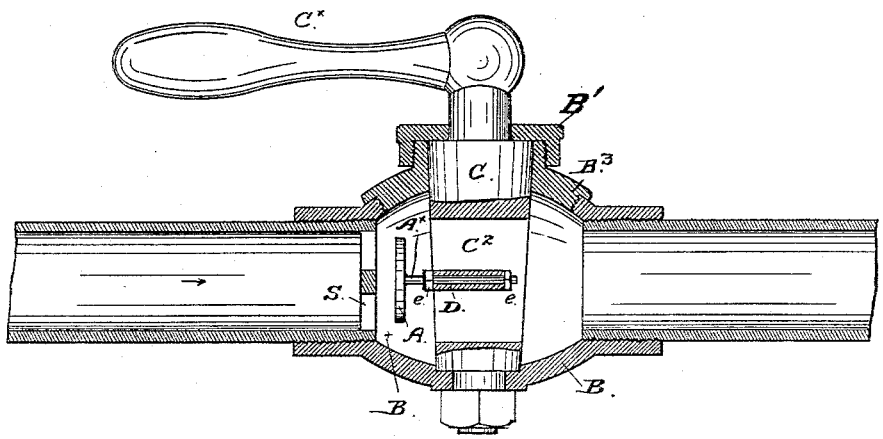
Fig. 2.
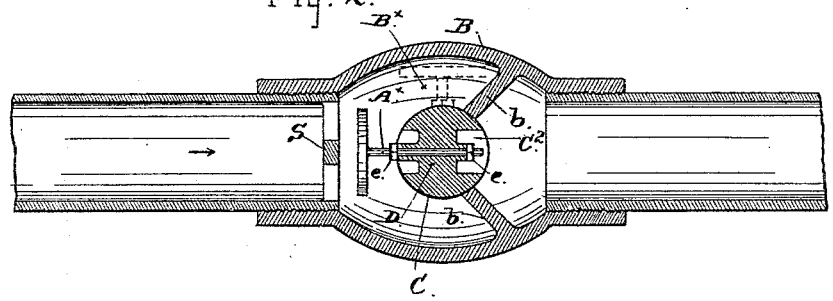
Fig. 3.
Witnesses:
R. H. Prat.
Fred W. Ray,
Inventor:
Martin Cresalia
By Smith & Osborn
his Atty's.

UNITED STATES PATENT OFFICE.

MARTIN CRESALIA, OF SAN FRANCISCO, CALIFORNIA.

WATER-REGULATOR ATTACHMENT.

SPECIFICATION forming part of Letters Patent No. 388,954, dated September 4, 1888.

Application filed May 11, 1888. Serial No. 273,583. (No model.)

*To all whom it may concern:*

Be it known that I, MARTIN CRESALIA, a citizen of the United States, residing in the city and county of San Francisco, and State of California, have invented certain new and useful Improvements in Pressure-Regulators for Water-Supply Pipes; and I do hereby declare that the following is a full, clear, and exact description of my said invention, reference being had to the drawings that accompany and form part of this specification.

This invention relates to devices for regulating the force or pressure of water in service-pipes; and it is an improvement on that regulator or device for the purpose which has been made the subject of a prior application for patent by me, the same having been filed in the Patent Office on or about the 18th day of April, 1888, Serial No. 271,081.

The present improvement consists in the addition to and combination, with the "spider" or pressure-reducer in my prior device, of an adjustable disk of suitable size to cover the reducer, and capable of being set at greater or less distance in front of that part, and with a cock or plug and its chamber; also, in certain construction and combination of parts, forming an improved regulating device, all as hereinafter fully set forth.

The following description explains the nature of these improvements and the manner in which I proceed to construct, produce, and apply the same, the accompanying drawings being referred to by figures and letters.

Figure 1 is a vertical longitudinal section through the body and parts of the regulator, the same being placed in a service-pipe between the meter and the service-cock or faucet. Fig. 2 is a section taken horizontally through the center. Fig. 3 is a front view of the spider.

Similar letters of reference indicate like parts in all the figures of the drawings.

In this improvement I apply a disk, A, behind the spider or regulator S, and in such position that the face of the disk stands across and perpendicular to the direction of the pressure, and at greater or less distance away from the spider, so that the current, after passing through this last-named part, is met and still more reduced in velocity by the disk. The spider is fixed in the service-pipe, the same as in my former device; but the disk is adjustable toward and from the back of the spider to contract or enlarge the area of the passage. This adjustment is provided for by fixing the disk on a screw-threaded stem, $A^x$, and setting the same through a post or bearing in the body of the device, suitable nuts and washers being used to hold the stem in place. In the present improved construction I combine all these parts with a plug or shut-off cock, so that the device in itself answers both for a regulator and a shut off cock. This dispenses with the additional labor and trouble of inserting a plug or cock in the service-pipe in addition to the regulating device, as it reduces the cutting of the pipe and the additional joints.

The body B is fitted with a plug, C, provided with a handle, $C^x$, and seated in the usual manner in the body. In the center of the way or opening, $C^2$, through the plug is a web supporting a boss, D, in which the stem $A^x$ of the disk-regulator is set. The hole through this boss is in line with the center of the spider, and the stem passing through it is held by nuts $e\ e$ against longitudinal movement.

The width of the chamber $B^x$ is suitably proportioned to allow the disk to swing around as the plug C is turned, so that although this part is carried by the plug it does not interfere with the movement of the plug, and this last-named part can be turned in its seat when it is necessary to shut off supply-water.

The chamber $B^x$ is divided by the partitions $b\ b$ into inlet and delivery sides, in the former of which the regulator operates, and the body B is provided with an opening in the top closed by a screw-threaded part, B', for the purpose of allowing the plug and the regulating-disk to be withdrawn and replaced as occasion may require to set the disk at the desired distance from the fixed spider. The ends of the body are screw-threaded or otherwise formed for inserting and joining the ends of the service-pipe.

Having thus fully described my invention, what I claim, and desire to secure by Letters Patent, is—

In a water-pressure regulator for service-pipes, the combination of a suitable chamber, a fixed spider, S, a rotating plug or cock, C, and a disk, A, attached to the plug in position with relation to the spider as described, and capable of adjustment, as set forth.

In testimony that I claim the foregoing I have hereunto set my hand and seal.

MARTIN CRESALIA. [L. S.]

Witnesses:
C. W. M. SMITH,
CHAS. D. WHEAT.